June 4, 1957   G. H. FRITZINGER   2,794,488
FILM SPLICING MACHINE
Filed April 25, 1955   2 Sheets-Sheet 1
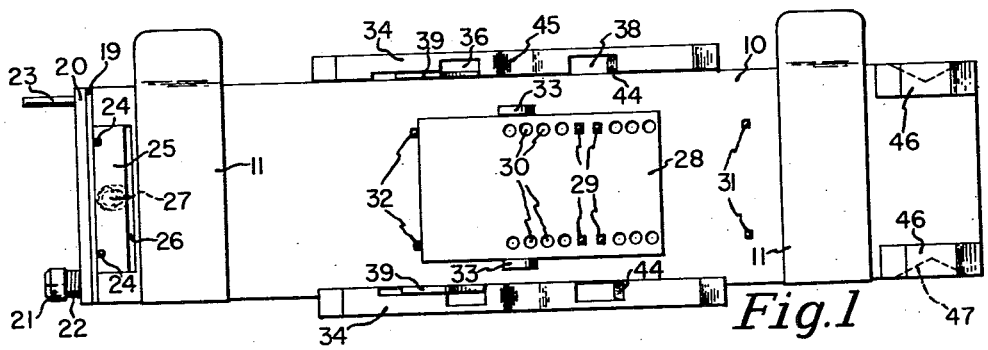
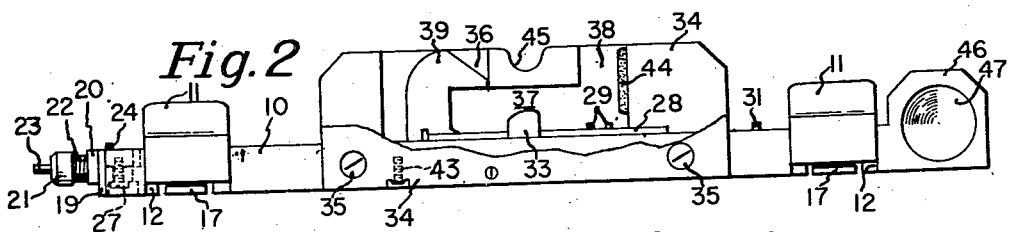
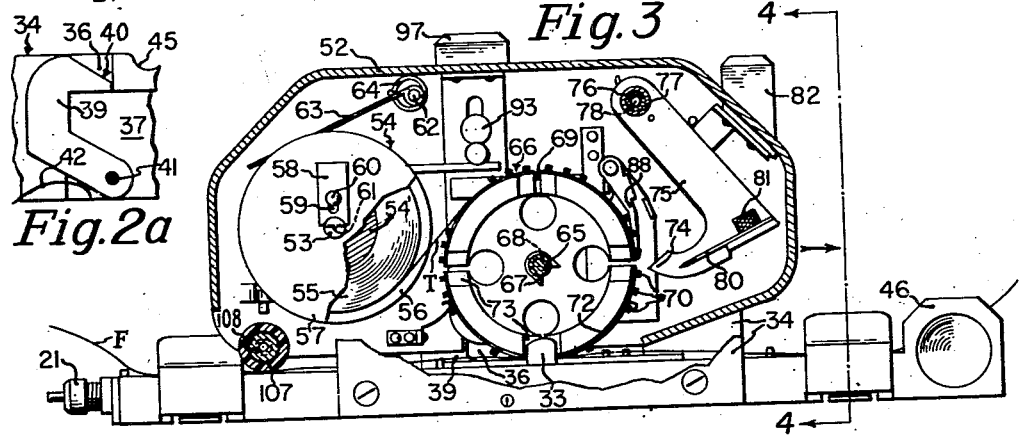
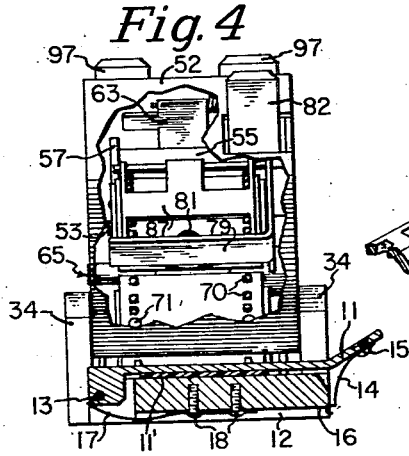
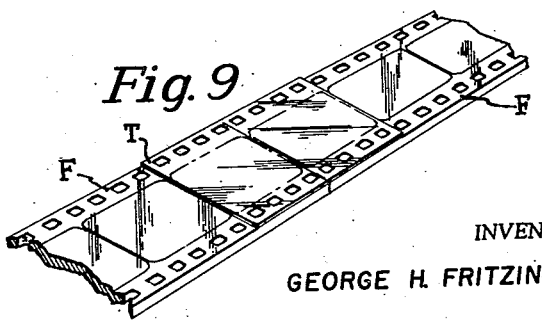
INVENTOR
GEORGE H. FRITZINGER
BY Lynn Barratt Morris
ATTORNEY

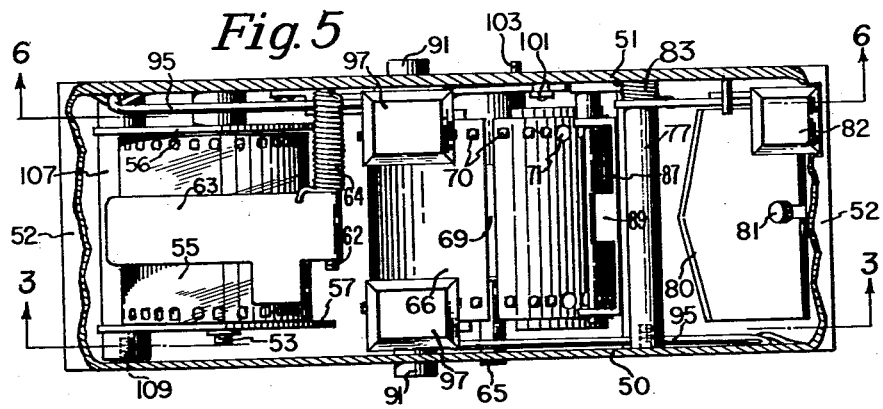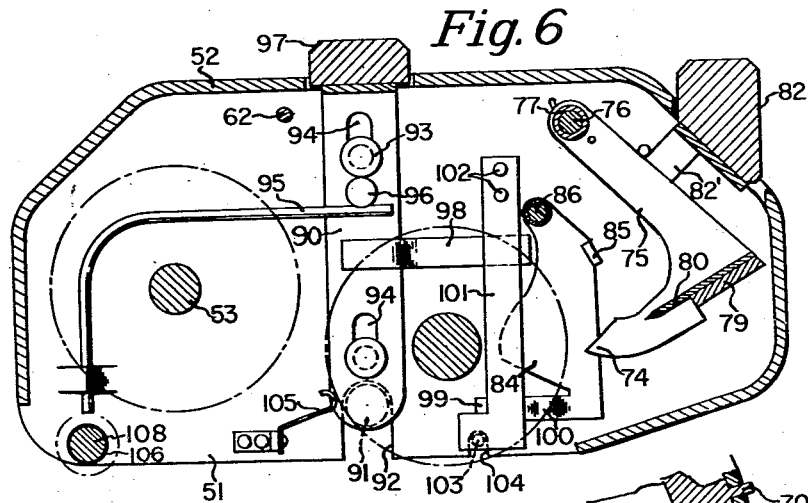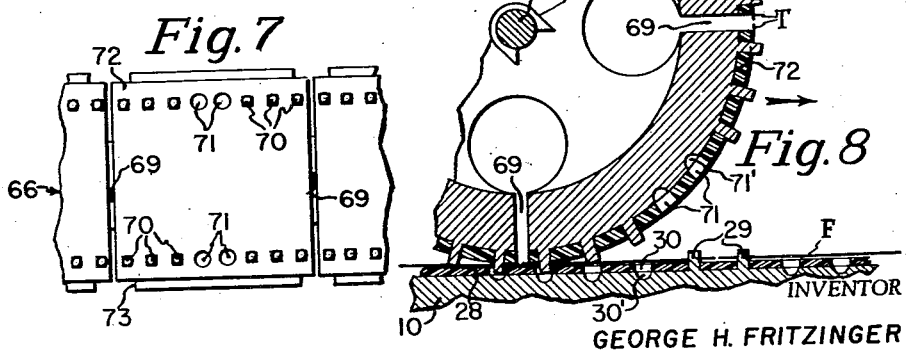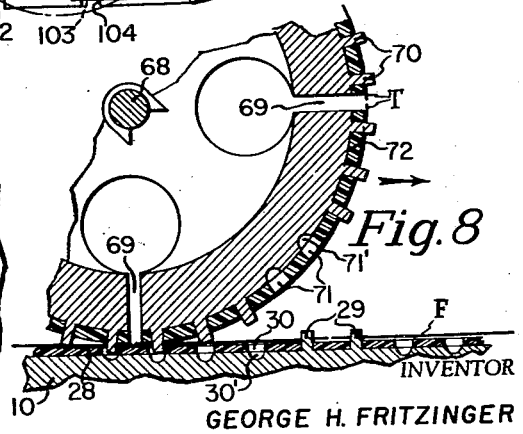

United States Patent Office 2,794,488
Patented June 4, 1957

2,794,488

FILM SPLICING MACHINE

George H. Fritzinger, West Orange, N. J., assignor to E. I. du Pont de Nemours and Company, Wilmington, Del., a corporation of Delaware Application April 25, 1955, Serial No. 503,385

13 Claims. (Cl. 154—42.1)

This invention pertains to a splicing machine and more particularly to a machine for splicing perforated strips, films, foils, tapes and the like. Still more particularly it pertains to a machine for splicing such articles with a perforated transparent tape having a layer of pressure-sensitive adhesive material. The invention further pertains to a tape dispensing unit and sprocket wheel.

An object of this invention is to provide a machine for rapidly splicing perforated motion picture film and sound film. Another object is to provide such a machine which gives splices which are in accurate registration. Yet another object is to provide such a machine which is easy to operate and dependable over long periods of time. A further object is to provide a splicing machine which can be used successfully in dimly lighted rooms. A still further object is to provide such a machine which is sturdy in construction and requires no special technique for its operation. Still other objects will be apparent from the following description of the invention.

The novel perforated tape splicing machine of this invention will now be described with reference to the accompanying drawings which constitute a part of the present specification. Referring now to the drawings:

Fig. 1 is a plan view of the film holder base unit;

Fig. 2 is a side elevational view of the base unit with parts broken away;

Fig. 2a (Sheet 1) is an elevation of the spring latch;

Fig. 3 is a cross-sectional view taken substantially along the line 3—3 on Fig. 5 of the tape dispensing unit said unit being positioned on the base unit (also in side elevational view, but with parts broken away) and showing sections of perforated film to be spliced;

Fig. 4 is an end elevational view with parts of the casing broken away and removed, with the base unit shown in section taken along line 4—4 of Fig. 3 in the direction indicated;

Fig. 5 is a plan view of the tape dispensing unit but with most of the top of the casing removed and with parts of the casing shown in section and broken section;

Fig. 6 is a vertical sectional view of the tape dispensing unit taken substantially along the line 6—6 of Fig. 5 and showing the relative position of the roll of pressure-sensitive tape and sprocket wheel in dotted outline;

Fig. 7 is a developed plan view of a portion of the sprocket wheel;

Fig. 8 is a sectional view on an enlarged scale of a segment of the sprocket wheel and base unit in operative position, and Fig. 9 is a perspective view of two abutting sections of motion picture film with a tape splice on one surface.

The film splicing device will now be described with reference to the various figures of the drawings wherein similar reference numerals refer to similar parts throughout the several views.

The base unit comprises a base plate 10 provided with film holding clamps 11, having resilient pads 11' on their under surface which are hinged at one end in spaced grooves 12 on hinge pins 13 and have spring locks 14 attached by means of screws 15 to their bottom surface at the opposite ends. These springs snap under ledges 16 and hold the clamps in closed position. The clamps are held in open position by means of flat springs 17 which press against their hinged ends. These springs are fastened to the bottom surface of the base plate by means of screws 18. The invention is not limited to the particular clamps shown and other suitable clamps can be substituted or, if desired, the clamps can be eliminated.

For convenience in squaring up the ends of film to be spliced, there is provided at the end of base plate 10 a cutter which consists of a fixed blade 19 screwed or otherwise affixed thereto and a movable blade 20 pivotally mounted at one end on screw 21. A spring 22 is placed between the head of the screw and the blade. A handle 23 is attached to the other end of the blade. Near the fixed blade are a pair of registration pins 24 on a slidable block 25 in a recess 26 in the upper surface of the base plate, for mounting the ends of the film to be squared. The block being movable can be adjusted for butt-splices or lap-splices. It is held in position by means of screw 27.

The base plate, which is preferably composed of non-magnetic metal, e. g., brass or an aluminum alloy, has a resilient plate or pad 28 near the center of its upper surface through which extend two pairs of aligning pins 29. These pins are spaced and shaped to accurately and fully fit adjacent perforations in motion picture or sound films to be spliced. The resilient pad (preferably made of rubber or a synthetic elastomer) as adjacent each pair of the aligning pins a row of holes 30 adapted to receive registration pins on a sprocket wheel in the tape dispenser unit (later described). Beneath these holes are coacting recesses 30' in the non-yielding surface of the base plate, which have the same purpose as holes 30. Between the ends of the resilient pad and each clamp are a pair of guide pins 31 and 32 protruding from the surface of the base plate. These pins are spaced to fit with appropriate perforations in the films to be spliced.

Upon the upper surface of the base plate and on each side of pad 28 adjacent two registration holes 30 are a pair of aligning lugs 33 which interfit with and position the sprocket wheel in the tape dispenser unit.

Base plate 10 is provided with side rails 34 affixed to its sides (adjacent the resilient pad, aligning pins and lugs) in any suitable manner e. g., by means of screws 35. Each side rail has a vertical guideway 36 in its inner surface communicating with a horizontal guideway 37, in turn communicating with a second vertical guideway 38 which guideways from a U-shaped path, as shown in Fig. 2. Adjacent guideway 36 and extending through part of its guide area is a latch 39 having a cam surface 40, said latch being pivoted on pin 41 and being pressed to a closed position by means of spring 42 attached to the base plate by a screw 43 (as shown in Fig. 2a with more particularly). In guideway 38 there is provided a resilient bumper 44.

For convenience, the side rails are provided with semi-circular grooves 45 to form a cradle for the tape dispenser unit when not in use. As a further convenience, one end of the base plate is provided with lugs 46 with concave recesses 47 for holding the base unit while operating the splicing machine. Of course, the base unit can be bolted or otherwise secured to a work bench or surface.

The tape dispensing unit consists of a casing having side walls 50 and 51 and cover 52 extending between the walls along the top and sides and under a portion of the bottom to enclose the working parts in the tape dispensing unit. Extending from side wall 51 is a shaft 53 on which is journalled a reel 54 having an enlarged hub portion 54' for receiving a roll 55 of pressure sensitive tape T, and side flanges 56 and 57 the latter of which is removable and can be locked in place by means of catch 58 the end of which is semicircular and fits into a groove 61 in the surface of the shaft. A screw or rivet 60 passing through slot 59 holds plate 58 on flange 57.

Also extending from side wall 51 is shaft 62 on which is journalled the sleeved end of drag plate 63 which is pressed against the roll of tape by means of torsion spring 64.

Upon shaft 65 extending from side wall 51, there is journalled a sprocket wheel 66 which is held in position by a snap ring 67 interfitting with groove 68 on the shaft. The sprocket wheel is divided into quadrants which are separated by radial slots 69 adapted to receive a tape cutting blade (later described). The curved surface of each quadrant has six registration pins 70 in rows along each edge of the sprocket. Proceeding from each radial slot are three pins, then two registration holes 71 that interfit with aligning pins 29 on the base plate, then the other three registration pins. The surface of each segment of the sprocket may be provided with a layer 72 of resilient material covering the area of the pressure sensitive splicing tape and film to be spliced. This layer has registration holes 71 matching holes 71' in the surface of the sprocket wheel.

Radial slots 69 are enlarged at each edge of the sprocket wheel to form aligning slots 73 which receive aligning lugs 33 on the base plate and place the sprocket wheel and pressure sensitive tape in proper position for a film splicing operation. Slots 73 also receive the nose 74 on cutter lever 75 pivoted at one end on shaft 76, also mounted on side wall 51. The pivoted end consists of a lateral sleeve 77 welded or otherwise affixed to the lever. This sleeve slips over the stub shaft, which preferably extends to the other wall, and has an internally threaded end 78. Extending laterally from the lever is an arm 79 on which is removably mounted a cutter blade 80 by means of screw 81. The blade is actuated by means of push button 82 connected to the lever by arm 82'. A torsion spring 83 surrounding the shaft returns the blade, arm and button to its initial position after the cutting action. Cam lever 84 having lateral arm 85 which contacts cutter lever 75 is pivoted at its upper end on shaft 86. Also journalled on shaft 86 is a hold-down claw 87, the spaced arms 88 of which serve to hold tape T on sprocket pins until the cutting action is completed. It is pivoted so that the tape can be threaded, that is, placed on the sprocket registration pins upon inserting a roll of perforated pressure sensitive tape into the tape dispensing unit. One extended end of the claw constitutes a flat spring portion 89 which presses against the shaft.

Spring-biased arms 90 having a lateral guide lug 91 (which can be a roller) protruding through open-end slots 92 are slidably mounted on each side wall of the casing by means of headed rivets or screws 93 which extend through narrow slots 94. The lateral guide is adapted to engage in the guideways of the base unit described above. One end of spring 95 is fixed to the side wall of the casing and the other presses against a suitable abutment, e. g., pin 96 on arm 90. This spring forces the arm upwardly. The upper end of the arm has the end bent over to form a surface for pressing it downwardly with the thumb or finger and may have a button 97.

Extending from arm 90 is a lateral arm 98, the end of which follows the curved surface of cam lever 84. The bottom of the cam lever has a lateral extension 99 having on its surface a curved protuberance 100 which serves to lift leaf spring 101 which is fastened to the side wall at its upper end by means of rivets 102. At the lower end of this spring is a perpendicular pin 103 that passes through an open-ended slot 104 in the side wall and, when in extended position, extends beyond the outer wall of the casing, thus preventing insertion of the tape dispensing unit in the base unit unless a section of tape has been previously cut on a gradient of the sprocket wheel.

The various elements or parts described in the previous paragraph constitute a novel "safety" mechanism to insure that the tape splicing unit is in proper condition for a positive tape splicing operation. If desired, it can be eliminated, or a different type of "safety" mechanism substituted, particularly if a different type of cutter is used to sever the tape positioned on the segments of the sprocket wheel.

In order to prevent back-lash of the sprocket there is provided spring detent 105 the outer end of which presses between registration pins on the sprocket. The inner end of the spring may be fixed to the casing wall in any suitable manner.

Near the bottom back end of the casing is a roller 106 having a resilient surface 107 which is journalled on shaft 108 extending between the casing sidewalls. One end of the shaft is fixed to a side wall, e. g., by welding and the other is threaded to receive screw 109 extending through a bevelled hole in the casing wall. A similar bevelled opening is opposite the end of shaft 76 for the insertion of screw like 109. The surface of roller 106 rides on the film during splicing.

The operation of the tape splicing machine will be apparent from the above description of the various parts. Briefly it operates as follows:

The ends of motion picture film or similarly perforated magnetic sound film to be spliced are cut on the square and then placed on the aligning pins with cut ends abutting. They are smoothed down on the guide pins and clamped in place. The tape dispenser unit with the tape extending substantially around three quadrants of the sprocket wheel is cut by means of the cutter blade so that the bottom quadrant carries a strip of tape free from the web. By making the tape perforations slightly smaller than the conventional size of motion picture film perforations the tape will be retained on the sprocket pins. This can also be accomplished by having the base of the pins slightly larger.

The tape dispensing unit is then pressed down into the base plate unit with guide rollers fitting into the vertical guides to give approximately the proper position. As the unit descends onto the aligning lugs the bottom sprocket wheel pins precisely enter the film perforations. After pressing the buttons in the arms carrying the guides, the latches snap back locking the unit in position for horizontal movement. Then the unit is pushed in a horizontal direction until the guide rollers strike the bumpers in the vertical guideway, and finally it is lifted from the base unit. Next the clamps are opened the spliced film turned over so that a tape can be applied to the reverse side and the steps repeated.

Due to the resilient surfaces on the sprocket and base plate the tape is applied smoothly and free from wrinkles or bubbles. These surfaces can be made of rubber or any synthetic elastomer which is tough and has a smooth surface.

If the splicing device is to be used for the splicing of magnetic sound tape, it is best not to have any magnetic materials in either unit. Brass, aluminum alloys and other non-magnetic alloys or metals can be used. In order to have a durable strong construction it is best to have the main parts made of metals, but plastic materials e. g., nylon, hard rubber, etc., can be used for certain parts.

The device described above obviously can be modified in various ways if desired and still contain the essential operating parts. The tape dispensing unit can be used with different types of bases with modified guideways etc. While the construction shown is for doubly perforated motion picture film, by eliminating registration pins on one side of the sprocket wheel and base the device can be used to splice narrow width cine film having perforations along one edge.

The perforated tapes useful in the invention may consist of a base of any strong transparent material such as a cellulose derivative, e. g., cellulose acetate, cellulose propionate; or regenerated cellulose, e. g., cellophane or a superpolymer, e. g., polystyrene, polyvinyl chloride poly (vinylchloride co vinylacetate), nylon, polyethylene terephthalate or vinylidine chloride copolymer. Any of the usual tacky adhesives are useful for the pressure sensitive adhesive layer. Suitable adhesives are described in Drew Patent 2,177,627.

The tape splicing machine of this invention has the advantages that it eliminates the use of solvent cements and the scraping of emulsions from the films. Another advantage is that strong splices can be readily obtained in dimly lighted rooms. Yet another advantage is that the device is easy to operate and gives dependable results over long periods of time. A further advantage is that one does not have to touch the tacky surface of the pressure sensitive tape. A still further advantage is that splices can be made in a very short time. Still further advantages will be apparent from the above description.

The embodiments of the invention in which an exclusive property or privilege is claimed are defined as follows:

1. A tape splicing machine comprising a base plate having adjoining registration pins for holding in splicing position strips of perforated film to be spliced, means for positioning a pressure-sensitive perforated tape dispensing unit in register with said pins and film, said unit comprising a casing containing a sprocket wheel having equally spaced radial slots dividing its surface into segments, each segment having at least one row of equally spaced registration pins with intervening registration holes near the edge of said wheel, said registration holes adapted to receive said registration pins on said base plate, means for revolubly supporting a roll of pressure-sensitive tape and means for cutting said tape on said segment.

2. A tape splicing machine comprising a base plate having adjoining registration pins for holding in splicing position strips of perforated film to be spliced, aligning lugs and side walls containing guideways, a tape dispensing unit comprising a casing, guide means on the casing, said casing containing a revolubly mounted sprocket wheel having equally spaced radial slots dividing its surface into segments, each segment having at least one row of equally spaced adjacent registration pins with intervening adjacent registration holes near the edge of said wheel, said registration holes adapted to receive said registration pins on said base plate, one end of each of said slots being enlarged to form aligning slots, and means for revolubly supporting a roll of pressure-sensitive tape, and means for cutting a strip of tape on said segment.

3. A tape splicing machine comprising a base plate having adjoining registration pins for holding in splicing position strips of perforated film to be spliced, aligning lugs on said base adjacent said pins, side walls containing vertical and horizontal guideways forming a U-shaped path, a tape dispensing unit comprising a casing, guide means slidably mounted on the casing, said casing containing a revolubly mounted sprocket wheel having equally spaced radial slots dividing its surface into segments, each segment having a row of equally spaced registration pins with intervening adjacent registration holes near each edge of said wheel, said registration holes adapted to receive said registration pins on said base plate, one end of each of said slots being enlarged to form aligning slots, means for revolubly supporting a roll of pressure-sensitive perforated tape, a lever having an aligning end and carrying a cutter blade and means for actuating said blade.

4. A tape splicing machine comprising a base plate having adjoining registration pins for holding in splicing position strips of perforated film to be spliced, aligning lugs and side walls containing guideways, a tape dispensing unit comprising a casing, guide means on the casing, said casing containing a revolubly mounted sprocket wheel having four equally spaced radial slots dividing its surface into four segments, each segment having a row of three equally spaced adjacent registration pins with two intervening adjacent registration holes, then three equally spaced registration pins near the edge of said wheel, said registration holes adapted to receive said registration pins on said base plate, one end of each of said slots being enlarged to form aligning slots, and a reel for revolubly supporting a roll of pressure-sensitive tape, and means for cutting a strip of tape on said segment.

5. A tape splicing machine as set forth in claim 4 wherein said sprocket wheel is provided with a spring pressed detent coacting with the registration pins.

6. A tape splicing machine comprising a base plate having adjoining registration pins for holding in splicing position strips of perforated film to be spliced, aligning lugs on said base plate adjacent said pins, side walls containing vertical and horizontal guideways forming a U-shaped path, a spring-biased latch in one of said vertical guideways, a tape dispensing unit comprising a casing, spring-biased guide means slidably mounted on the casing, said casing containing a revolubly mounted sprocket wheel having four equally spaced radial slots dividing its surface into segments, each segment having a row of three equally spaced registration pins with two intervening adjacent registration holes which are adapted to receive said registration pins on said base plate, the three equally spaced registration pins near each edge of said wheel, one end of each of said slots being enlarged to form aligning slots, a reel for revolubly supporting a roll of pressure-sensitive perforated tape, a lever having an aligning end and carrying a cutter blade and means for actuating said blade.

7. A tape splicing machine as set forth in claim 5 wherein said casing contains a pivoted lever having a cam side and a protuberance for lifting a spring-pressed pin which prevents insertion of the casing unit into the guideway unless the cutter blade has been actuated, and a lateral arm on said guide means coacting with said cam side to retract said arm from pin lifting position.

8. A tape splicing machine as set forth in claim 6 wherein said base plate has a resilient surface adjacent said pins and said sprocket wheel segments have resilient surfaces.

9. A machine as set forth in claim 8 wherein said casing is provided with a resilient roller on its bottom surface.

10. A tape-dispensing device for dispensing short cut lengths of pressure-sensitive perforated tape comprising a casing containing a sprocket wheel having four equally spaced radial slots dividing its surface into four segments each segment having a row of three equally spaced adjacent registration pins with two intervening adjacent registration holes which are adapted to interfit with registration means, then three equally spaced registration pins near the edge of said wheel, one end of each of said slots being enlarged to form aligning slots, and a reel for revolubly supporting a roll of pressure-sensitive tape, and means for cutting a strip of tape on said segment.

11. A tape-dispensing device for dispensing short cut lengths of pressure-sensitive perforated tape comprising a casing containing a revolubly mounted sprocket wheel having four equally spaced radial slots dividing its surface into segments, each segment having a row of three equally spaced registration pins with two intervening adjacent registration holes which are adapted to interfit with registration means, then three equally spaced registration pins near each edge of said wheel, one end of each of said slots being enlarged to form aligning slots, a reel for revolubly supporting a roll of pressure-sensitive perforated tape, a lever having an aligning end and carrying a cutter blade and means for actuating said blade.

12. A sprocket wheel for a perforated tape dispensing device having four equally spaced radial slots dividing its surface into segments, each segment having a row of three equally spaced registration pins, two intervening adjacent registration holes which are adapted to interfit with registration means and three equally spaced registration pins near each edge of said wheel.

13. A sprocket wheel for a perforated tape dispensing device having four equally spaced radial slots dividing its surface into segments, each segment having a row of three equally spaced registration pins, two intervening adjacent registration holes which are adapted to interfit with registration means and three equally spaced registration pins near each edge of said wheel, one end of each slot being enlarged to form aligning slots.

References Cited in the file of this patent

UNITED STATES PATENTS

| | | |
|---|---|---|
| 1,121,765 | Schultze | Dec. 22, 1914 |
| 1,994,913 | Howell | Mar. 19, 1935 |
| 2,002,554 | Townley | May 28, 1935 |

FOREIGN PATENTS

| | | |
|---|---|---|
| 297,576 | Great Britain | Sept. 27, 1928 |